United States Patent [19]

Ringwall et al.

[11] 4,306,148

[45] Dec. 15, 1981

[54] TACTILE SENSOR

[75] Inventors: Carl G. Ringwall, Scotia; Allen W. Case, Jr., Amsterdam, both of N.Y.

[73] Assignee: General Electric Company, Schenectady, N.Y.

[21] Appl. No.: 114,374

[22] Filed: Jan. 21, 1980

[51] Int. Cl.³ .............................................. G01D 5/34
[52] U.S. Cl. .................................... 250/229; 250/215
[58] Field of Search ....................... 250/229, 227, 215; 35/35 A; 340/365 P, 365 A

[56] References Cited

U.S. PATENT DOCUMENTS 3,304,381  2/1967  Shlesinger ..................... 340/365 A
4,013,342  3/1977  Narodny ......................... 340/365 P
4,049,964  9/1977  Wuchinich ........................ 250/229

*Primary Examiner*—David C. Nelms
*Attorney, Agent, or Firm*—Donald R. Campbell; James C. Davis; Marvin Snyder

[57] ABSTRACT

A tactile area sensor for robots has an array of pneumatic flow passages. The air flow in each passage is dependent on a localized force exerted by an object pressing against an elastic pad on the face of the sensor. The air flow impinges on a metallic tab and its angular displacement is sensed by directing a light beam from an optical fiber onto the tab and monitoring the quantity of light reflected to a paired optical fiber. The array of optical outputs can be presented to a charge injection device and are dependent on the shape of the object.

8 Claims, 10 Drawing Figures

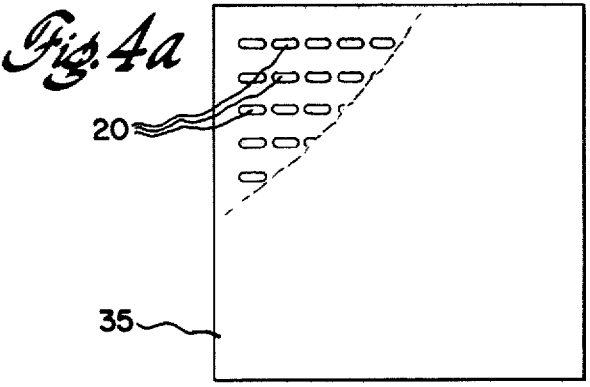
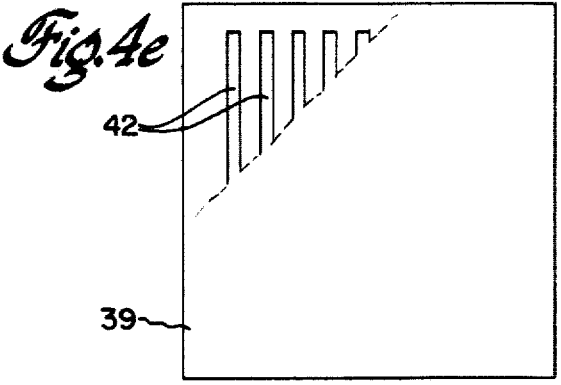
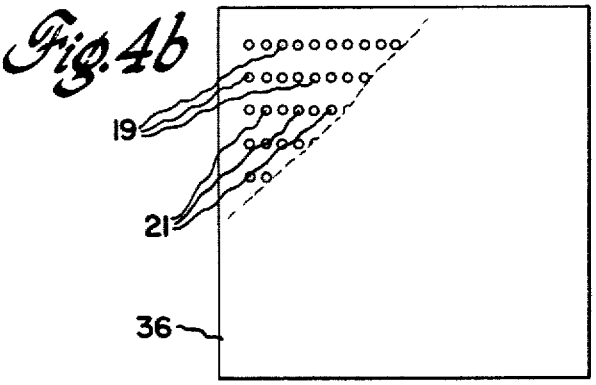
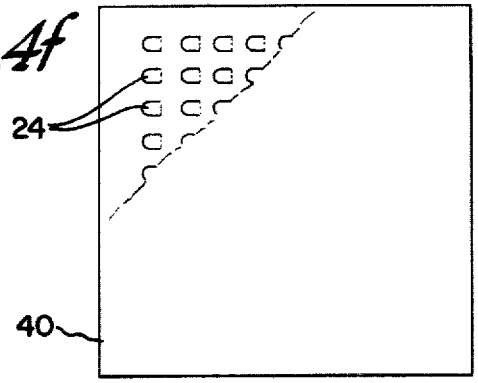
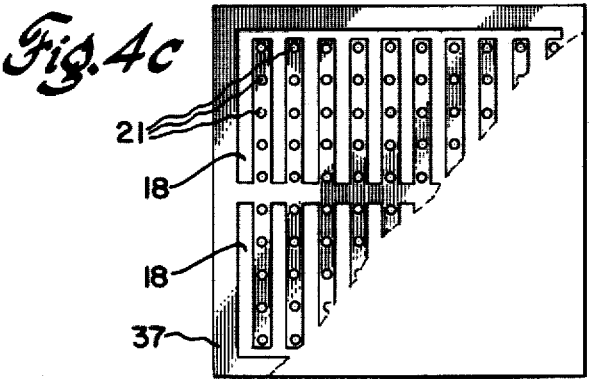
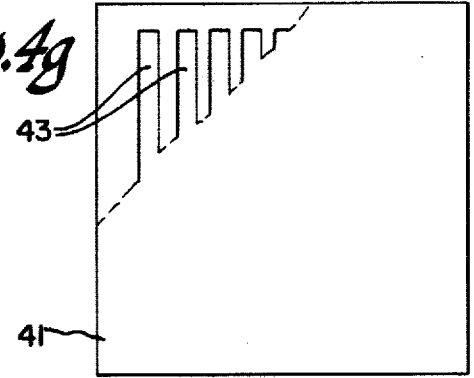
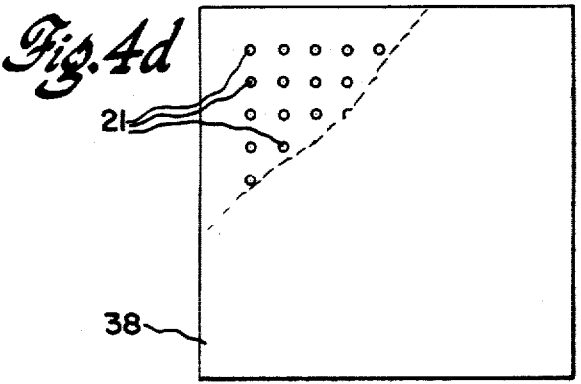

TACTILE SENSOR

BACKGROUND OF THE INVENTION

There is a widely documented need for tactile area sensors to provide a sense of feel for computer controlled robots and programmed assembly machines. This type of sensor can be used for object identification as well as for insertion and mating tasks associated with assembly. The preferred location of the sensor is on the extremity of a movable finger. Consequently, the sensor must be compact and rugged and capable of being interrogated with a minimum of communication channels to the system computer. In addition, the sensor must be low cost, have good stability, and provide resolutions of better than one hundred bits per square inch to be compatible with industrial applications.

Many concepts for tactile area sensors have been proposed, but with the exception of low density sensors based on guided rods or force activated switches, most have not been reduced to practice. Those concepts based on resistance change of conductive rubber, graphite filled foam, or carbon fibers have the potential for low cost, durable sensors; however, technical problems have not been solved. Concepts based on arrays of conventional pressure sensors are technically feasible but the cost is prohibitive.

SUMMARY OF THE INVENTION

The improved tactile sensor has an elastic pad attached to one surface of a rigid pneumatic subassembly which has a two-dimensional array of separate flow passages. The back surface of the elastic pad forms one wall of a portion of each passage such that force exerted by an object pushes this wall into the passage and restricts the flow. Conversion of flow to a usable signal is accomplished by impinging the air flow onto a resilient light reflective tab at the exit of each passage. A pair of optical fibers are supported above every tab; the angular displacement of the tab is measured by directing a beam of light from one fiber onto the tab and monitoring the quantity of light reflected to the other fiber. The array of optical outputs are dependent on the force distribution and thus the shape of the object. The optical fibers carrying the reflected light from the various tabs may be arranged in any array facing the sensitive surface of a charge injection device (CID) imager sensor. Read-out circuitry developed for the solid state camera can thus be used to send data to a computer or produce an image for further analysis.

A laminated construction of the pneumatic subassembly and tab array yields a compact, high resolution sensor. The laminations are preferably of stainless steel and are etched to delineate the flow passages and a common plenum and to create the spring tabs.

BRIEF DESCRIPTION OF THE DRAWINGS

FIGS. 4a–4g are plan views of laminations which are stacked and bonded together to construct the sensor flow passages and tabs.

DESCRIPTION OF THE PREFERRED EMBODIMENTS

Figure 1:
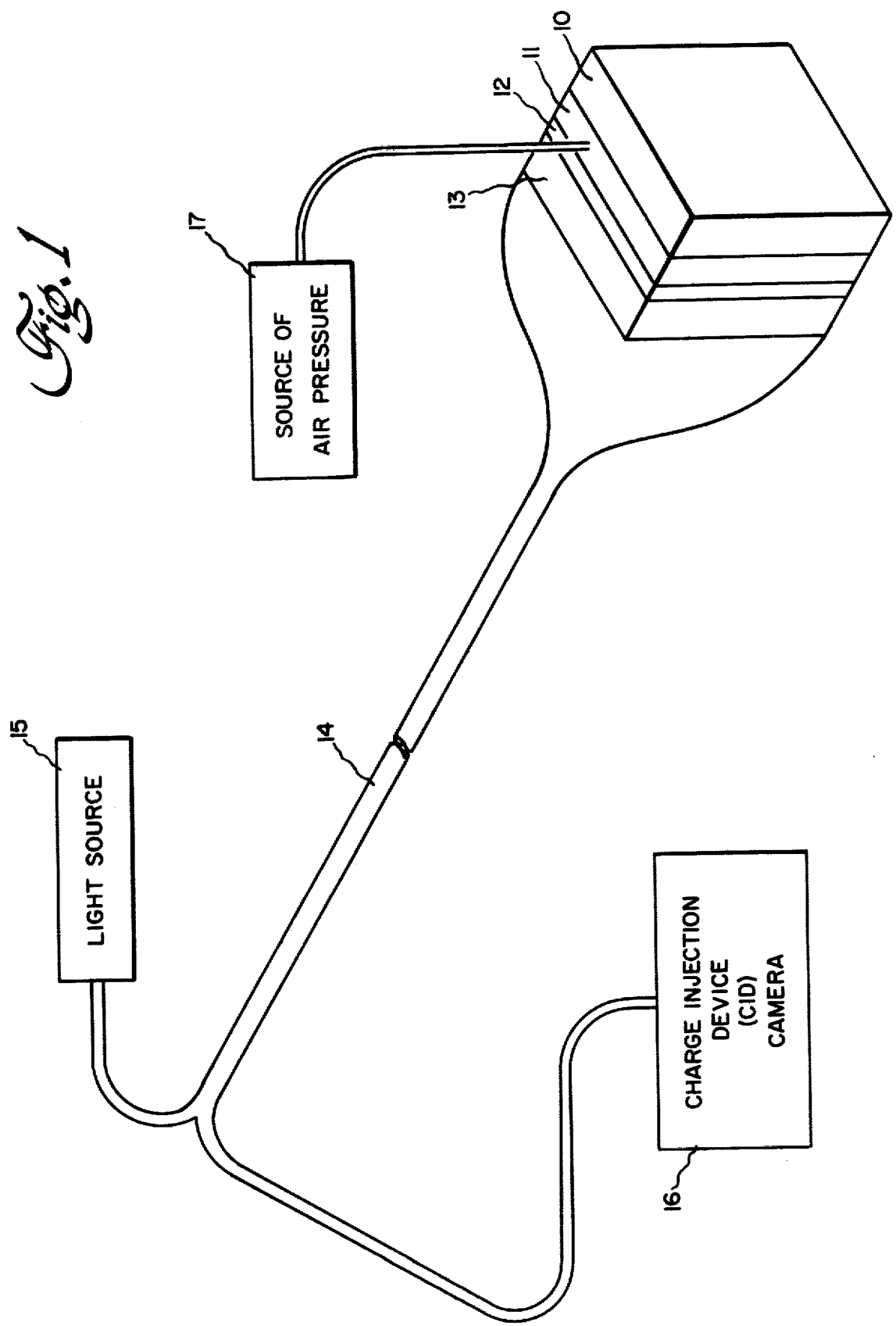
FIG. 1 is a perspective view of the tactile area sensor and of optical fiber cables to a light source and to a charge integrated device solid state camera.

The various component parts of the improved tactile area sensor are depicted schematically in FIG. 1. The sensor has an array of pneumatic flow passages, and the air flow in each passage is made dependent on a localized force exerted against the sensor face. The quantity of air flow exiting from each passage is sensed and an array of optical outputs are developed which are dependent on the force distribution and thus the shape of the object. The first component part is an elastic pad 10 such as latex or silicone rubber and is used to grip the metal or ceramic part being handled. Pneumatic subassembly 11 contains the pneumatic manifolds and flow passages, which extend to or intercept the interface between parts 10 and 11 where the variable flow restriction occurs as pressure is exerted on the face.

The third major component is an array of flow sensing tabs 12 which are both resilient and light reflecting. Conversion of flow to a usable signal is accomplished by impinging the air flow on a metallic tab at the exit of each passage. The fourth part is an array of optical fibers 13, one pair of fibers per sensing cell. The angular displacement of the flow sensing tab is measured by directing a light beam from one fiber onto the surface of the tab and monitoring the quantity of light reflected to the paired fiber. A bundle 14 of optical fibers carries light to the tactile sensor from a single light source 15 and the fibers carrying the reflected light from the various tabs are arranged in an array facing the sensitive surface of a charge injection device (CID) imager sensor 16. The CID and associated addressing and read-out integrated circuits developed for the Solid State Camera manufactured by the General Electric Company can then be used to produce a three-dimensional image related to the force distribution and thus the shape of an object pressed against the surface of a tactile area sensor. Assuming that the tactile sensor has a 10×10 array of sensing cells, then a small 128×128 CID array is more than adequate.

Figure 2:
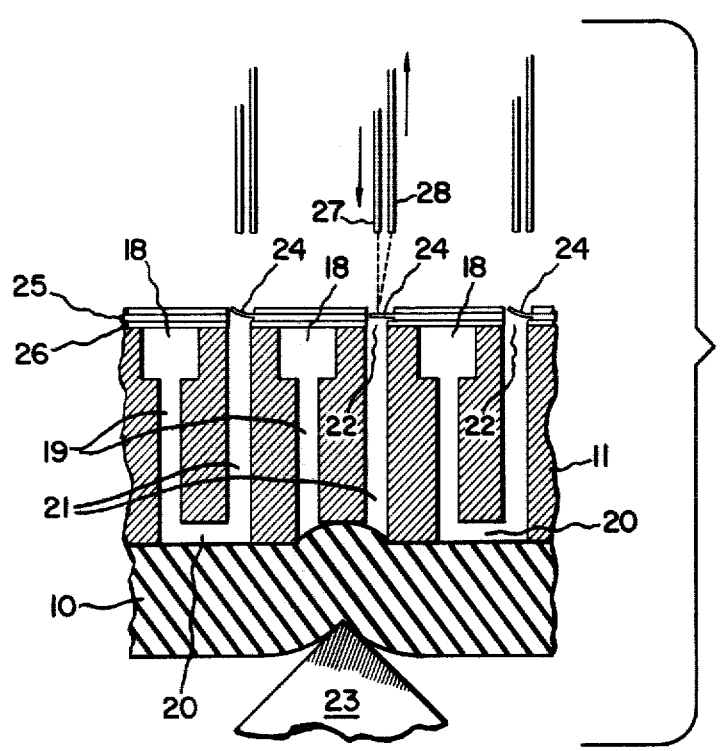
FIG. 2 is a cross section illustrating several sensing cells and the restriction of air flow by a grasped object.

FIG. 2 illustrates the flow passage of a single sensing cell and restriction of the flow by the force transmitted through elastic pad 10. The flow from a source of air pressure 17 (FIG. 1) is brought into a plenum 18 which is common to all the flow passages in the sensor. Every flow passage consists of a first passage 19 which extends from the plenum to an interconnected passage 20 parallel to the surface of pneumatic subassembly 11 and hence to a second passage 21 which has an exit port 22 at the other major surface of the pneumatic subassembly. The back surface of elastic pad 10 forms one wall of shallow connecting channel 20; as force is exerted on the pad by object 23, this wall is pushed into the channel and restricts the flow. Removal of the force will cause the wall to move out due to both the resiliency of the pad and the back pressure built up in the channel. The flow exiting from passage 21 impinges on a spring tab 24 on plate 25, causing the tab to deflect proportionately to the flow. This tab is set back from exit port 22 by spacer plate 26 sufficiently far so as not to impede the flow but yet recover the full momentum of the flow velocity. A light beam from an optical fiber 27 is directed normal to the plane containing resilient tabs 24. This beam is reflected from the tab surface to a second optical fiber 28.

Relative spacing between optical fibers 27 and 28 and between the fiber end face and tab 24 are matched to the optical fiber diameter to yield a linear relationship, over the expected range, between tab deflection and light captured in optical fiber 28. The angular deflection of cantilever tab 24 is proportional to the quantity of exiting air flow which in turn is proportional to the deformation of elastic pad 10 by object 23. It is possible to accurately sense about five percent of the total light reflection and thus twenty angular positions of tab 24. These tabs are made of a metal such as stainless steel that is a good light reflector and has a nonhysteritic characteristic so that it returns each time to a given angular position for a given quantity of air flow. The light output signal for the sensing cell, it is emphasized, is an analog signal as is required for a high resolution sensor with 100–200 bits per square inch.

Figure 3:
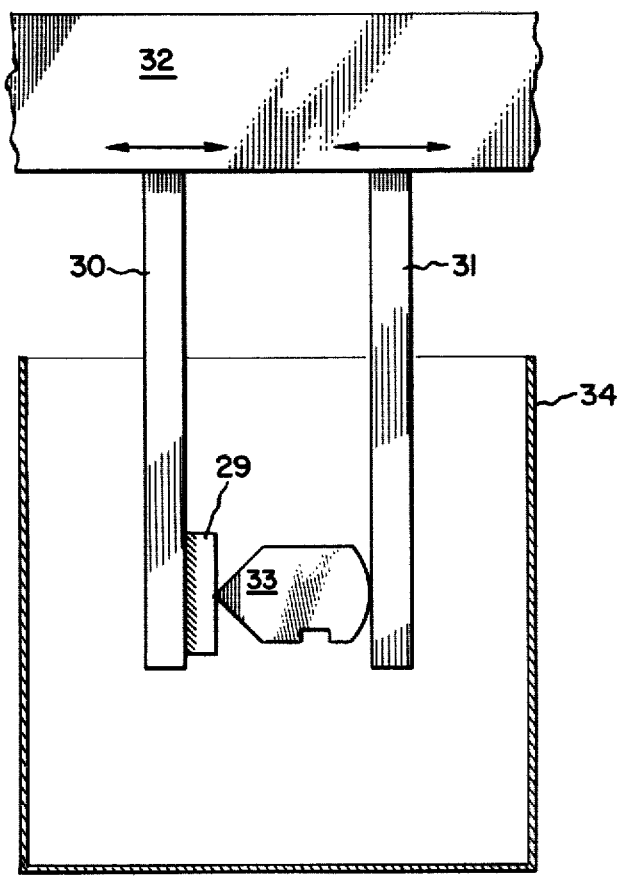
FIG. 3 is a sketch of a tactile sensor mounted on one of two fingers which are movable on a support structure to pick up parts from a bin.

FIG. 3 illustrates schematically a typical industrial application of picking up a part out of a deep container filled at random with a large number of the same parts, to identify where the object has been grasped and what its orientation is. This is known as the "bin picking problem". The tactile area sensor is mounted near the end of a movable arm which cooperates with another such arm, with or without a tactile sensor, to pick up a big object. They function much like the fingers to grasp and lift the object while giving the robot or programmable assembly machine a sense of feel to make it possible to know where along the length of the object it has been grasped and what its angular orientation is. In the figure, a tactile area sensor 29 is mounted near the end of one of two vertical arms 30 and 31 which are movable toward and away from each other on a support structure 32 to take hold of and lift a part 33 out of a bin 34. The two "fingers" or arms may be articulated or may be pivoted toward one another to grasp the object much like two fingers do.

The array of light output signals transmitted by optical fiber cable 14 to CID camera 16, FIG. 1, give a picture of the force distribution exerted by the object pressing into the tactile sensor. The charge injection device imager sensor can be of the type described in U.S. Pat. No. 3,993,897 granted to H. K. Burke and G. J. Michon, "Solid State Imaging Apparatus", assigned to the same assignee as this invention. The image sensor has a two-dimensional array of light-sensitive sensing sites, each of which is a pixel element, and the array of optical fibers are arranged in a similar two-dimensional pattern, one fiber per pixel element. In the same fashion as a television camera, the output information is read out at high speed and can be fed to a computer to process the information and come up with the topology of the grasped part. The objects being handled are, for example, the housing of a dishwasher pump, the top plate of a wall outlet, or a motor part such as an end shield or rotor and shaft.

A laminated construction of the pneumatic subassembly and flow sensing tabs and a technique of fabricating the sensor flow passages and tabs to yield a compact, high resolution sensor will be explained. FIGS. 4a–4g illustrate the general configurations required in the etched metal laminations. These stainless steel laminates would typically range from 0.001 to 0.01 inch in thickness. The pattern on each laminate is prepared in large scale art work, typically twenty to fifty times full scale. The art work is photo-reduced and applied as a photoresist to the laminate. After chemical etching to remove the desired material and cleaning, the laminates are stacked to produce a three-dimensional structure. Bonding of the stack is typically performed by diffusion bonding in either a vacuum or hydrogen atmosphere. This technique permits the economical production of intricate three-dimensional structures. Four etched laminates are required for the pneumatic subassembly and three for the tab array subassembly. The patterns for a two-dimensional array of one hundred sensing cells are depicted, and the etched holes to form the flow passages or portions of such passages for convenience are designated by the same numbers as in FIG. 2.

Stainless steel lamination 35 is at the rubber pad interface and forms all the interconnecting channels 20. Lamination 36 has double columns of round holes to form passages 19 and 21. Plenum 18 to feed all passages 19 and round holes to provide for continuation of passages 21 are formed by lamination 37. Lamination 38 serves a plenum cover and continuation of passages 21. Lamination 39 has ten long, narrow slots 42 and is a spacer lamination to position resilient tabs 24 the correct distance away from the exit ports of passages 21. Lamination 40 is etched to delineate the array of resilient cantilever tabs 24, and lamination 31 is a second spacer lamination with elongated slots 43. Laminations 35–39 are stacked and bonded together to form a monolithic structure. Lamination 40 is then clamped to the bonded structure by lamination 41 which also serves as the spacer between the tabs and fiber optics array.

This improved tactile area sensor has sufficient compactness and ruggedness to permit mounting on an industrial robot hand or programmed assembly machine. Furthermore, by utilizing charge injection device imager sensors and integrated circuit chips already developed for an expanding market, the sensor development and production costs are minimized. The sensor concept also lends itself to high packing density of individual sensing cells and consequently realizes high resolution.

While the invention has been particularly shown and described with reference to preferred embodiments thereof, it will be understood by those skilled in the art that various changes in form and details may be made therein without departing from the spirit and scope of the invention.

The invention claimed is:

1. A tactile area sensor comprising:
 a continuous elastic pad attached to a first surface of a rigid pneumatic subassembly;
 said pneumatic subassembly having an array of separate passages for the flow of gas from a common source to an exit port for each passage, the individual passages extending to said first surface so that an object pressing into said elastic pad exerts forces which result in deflections of said elastic pad and variably restricts gas flow through said passages; and
 output means adjacent to every exit port for sensing the quantity of gas flow and developing an array of optical outputs which are dependent on the force distribution and thus the shape of the object.

2. The tactile sensor of claim 1 wherein said output means includes an array of resilient tabs mounted above said exit ports that are angularly deflected dependent on the gas flow from the associated exit port.

3. The tactile sensor of claim 2 wherein said output means further includes a pair of optical fibers supported above every resilient tab for directing a beam of light onto said tab and for capturing reflected light.

4. The tactile sensor of claim 1 wherein said pneumatic subassembly has a plenum passage adjacent to a second surface and every separate flow passage consists of a first passage extending from said plenum to an interconnecting passage parallel to said first surface and hence to a second passage which exits at said second surface.

5. A tactile area sensor comprising:

a continuous elastic pad attached to a first major surface of a rigid pneumatic subassembly;

said pneumatic subassembly having an array of separate passages in columns and rows for the flow of air from a common source to an exit port for each passage on a second major surface of said subassembly, the individual passages extending to said first major surface so than an object pressing into said elastic pad exerts forces which result in deflections of said elastic pad and variably restricts air flow through said passages;

an array of resilient light reflective tabs mounted parallel to the second major surface of said pneumatic subassembly to be angularly deflected dependent on the air flow exiting from the associated passage; and optical fibers supported above said tabs for directing a beam of light onto each tab and capturing reflected light from the tab, the quantity of captured reflected light being indicative of the force exerted by the object and thus its shape.

6. The tactile sensor of claim 5 wherein said pneumatic subassembly has a plenum passage adjacent to said second surface and every separate flow passage consists of a first passage extending from said plenum to an interconnecting passage parallel to said first surface and hence to a second passage which terminates at said exit port.

7. The tactile sensor of claim 6 wherein said pneumatic subassembly has a laminated construction and is comprised of at least four etched metal laminations.

8. The tactile sensor of claim 7 wherein said array of tabs are on another metal lamination.

* * * * *